United States Patent
Leabman

(10) Patent No.: US 9,537,357 B2
(45) Date of Patent: Jan. 3, 2017

(54) WIRELESS SOUND CHARGING METHODS AND SYSTEMS FOR GAME CONTROLLERS, BASED ON POCKET-FORMING

(71) Applicant: Energous Corporation, San Jose, CA (US)

(72) Inventor: Michael A. Leabman, Pleasanton, CA (US)

(73) Assignee: Energous Corporation, San Jose, CA (US)

( * ) Notice: Subject to any disclaimer, the term of this patent is extended or adjusted under 35 U.S.C. 154(b) by 58 days.

(21) Appl. No.: 14/273,271

(22) Filed: May 8, 2014

(65) Prior Publication Data
US 2015/0326052 A1    Nov. 12, 2015

(51) Int. Cl.
| H02J 7/00 | (2006.01) |
| H01F 27/42 | (2006.01) |
| H02J 5/00 | (2016.01) |
| H02J 7/02 | (2016.01) |
| H04B 5/00 | (2006.01) |
| A63F 13/98 | (2014.01) |
| A63F 13/24 | (2014.01) |

(52) U.S. Cl.
CPC .............. *H02J 50/15* (2016.02); *A63F 13/24* (2014.09); *A63F 13/98* (2014.09); *H02J 5/005* (2013.01); *H02J 7/025* (2013.01); *H02J 50/40* (2016.02); *H04B 5/00* (2013.01); *H04B 5/0037* (2013.01); *Y10T 307/406* (2015.04)

(58) Field of Classification Search
CPC ......... H02J 7/025; H03J 5/005; B60L 11/1829
USPC ......................................... 320/108; 307/104
See application file for complete search history.

(56) References Cited

U.S. PATENT DOCUMENTS

| 3,696,384 A | * | 10/1972 | Lester | ..................... G01S 15/66 128/201.19 |
| 4,360,741 A | | 11/1982 | Fitzsimmons et al. | |
| 4,995,010 A | * | 2/1991 | Knight | ................ B63H 20/007 367/111 |
| 5,712,642 A | | 1/1998 | Hulderman | |

(Continued)

FOREIGN PATENT DOCUMENTS

| EP | 2545635 A2 | 1/2013 |
| EP | 2545635 A2 | 1/2013 |

(Continued)

OTHER PUBLICATIONS

International Search Report dated Sep. 12, 2014 corresponding to International Patent Application No. PCT/US2014/037072, 3 pages.

(Continued)

*Primary Examiner* — M'Baye Diao
(74) *Attorney, Agent, or Firm* — Eric L. Sophir; Dentons US LLP

(57) ABSTRACT

The present invention provides wireless charging methods and systems for powering game controllers. The methods and systems may include one or more transmitters and one or more receivers. In some embodiments the transmitters and receivers may be embedded to game console and game controllers, respectively. In other embodiments, the transmitters and receivers may be connected as a separate device to the game console and game controllers, respectively. The method may include wireless power transmission through suitable techniques such as pocket-forming utilizing sound waves.

23 Claims, 6 Drawing Sheets

(56) References Cited

U.S. PATENT DOCUMENTS

| | | |
|---|---|---|
| 5,936,527 A | 8/1999 | Isaacman et al. |
| 5,982,139 A | 11/1999 | Parise |
| 6,127,799 A | 10/2000 | Krishnan |
| 6,127,942 A | 10/2000 | Welle |
| 6,289,237 B1 | 9/2001 | Mickle et al. |
| 6,615,074 B2 | 9/2003 | Mickle et al. |
| 6,798,716 B1* | 9/2004 | Charych ............... H02J 17/00 367/119 |
| 6,856,291 B2 | 2/2005 | Mickle et al. |
| 6,960,968 B2 | 11/2005 | Odendaal et al. |
| 7,003,350 B2 | 2/2006 | Denker et al. |
| 7,027,311 B2 | 4/2006 | Vanderelli et al. |
| 7,068,991 B2 | 6/2006 | Parise |
| 7,191,013 B1 | 3/2007 | Miranda et al. |
| 7,403,803 B2 | 7/2008 | Mickle et al. |
| 7,451,839 B2 | 11/2008 | Perlman |
| 7,639,994 B2 | 12/2009 | Greene et al. |
| 7,643,312 B2 | 1/2010 | Vanderelli et al. |
| 7,786,419 B2 | 8/2010 | Hyde et al. |
| 7,812,771 B2 | 10/2010 | Greene et al. |
| 7,844,306 B2 | 11/2010 | Shearer et al. |
| 7,868,482 B2 | 1/2011 | Greene et al. |
| 7,898,105 B2 | 3/2011 | Greene et al. |
| 7,925,308 B2 | 4/2011 | Greene et al. |
| 8,099,140 B2 | 1/2012 | Arai |
| 8,115,448 B2 | 2/2012 | John |
| 8,159,090 B2 | 4/2012 | Greene et al. |
| 8,159,364 B2 | 4/2012 | Zeine |
| 8,180,286 B2 | 5/2012 | Yamasuge |
| 8,380,255 B2 | 2/2013 | Shearer et al. |
| 8,410,953 B2 | 4/2013 | Zeine |
| 8,432,062 B2 | 4/2013 | Greene et al. |
| 8,446,248 B2 | 5/2013 | Zeine |
| 8,447,234 B2 | 5/2013 | Cook et al. |
| 8,461,817 B2 | 6/2013 | Martin et al. |
| 8,558,661 B2 | 10/2013 | Zeine |
| 8,621,245 B2 | 12/2013 | Shearer et al. |
| 8,854,176 B2 | 10/2014 | Zeine |
| 8,897,770 B1 | 11/2014 | Frolov et al. |
| 9,000,616 B2 | 4/2015 | Greene et al. |
| 9,021,277 B2 | 4/2015 | Shearer et al. |
| 2005/0007276 A1 | 1/2005 | Barrick et al. |
| 2006/0238365 A1 | 10/2006 | Vecchione et al. |
| 2006/0284593 A1 | 12/2006 | Nagy et al. |
| 2007/0007821 A1 | 1/2007 | Rossetti |
| 2007/0060185 A1 | 3/2007 | Simon et al. |
| 2007/0178945 A1 | 8/2007 | Cook et al. |
| 2007/0191075 A1 | 8/2007 | Greene et al. |
| 2008/0309452 A1 | 12/2008 | Zeine |
| 2009/0200985 A1 | 8/2009 | Zane et al. |
| 2009/0243397 A1 | 10/2009 | Cook et al. |
| 2010/0027379 A1 | 2/2010 | Saulnier et al. |
| 2010/0033021 A1 | 2/2010 | Bennett |
| 2010/0194206 A1 | 8/2010 | Burdo et al. |
| 2010/0201201 A1 | 8/2010 | Mobarhan et al. |
| 2010/0244576 A1 | 9/2010 | Hillan et al. |
| 2010/0295372 A1 | 11/2010 | Hyde et al. |
| 2010/0309079 A1 | 12/2010 | Rofougaran et al. |
| 2010/0315045 A1 | 12/2010 | Zeine |
| 2011/0074342 A1 | 3/2011 | MacLaughlin |
| 2011/0115303 A1 | 5/2011 | Baarman et al. |
| 2011/0181120 A1 | 7/2011 | Liu et al. |
| 2011/0254503 A1 | 10/2011 | Widmer et al. |
| 2011/0281535 A1 | 11/2011 | Low et al. |
| 2011/0282415 A1 | 11/2011 | Eckhoff et al. |
| 2012/0080957 A1 | 4/2012 | Cooper et al. |
| 2012/0146576 A1 | 6/2012 | Partovi |
| 2012/0157019 A1 | 6/2012 | Li |
| 2012/0193999 A1 | 8/2012 | Zeine |
| 2012/0248891 A1 | 10/2012 | Drennen |
| 2012/0274154 A1 | 11/2012 | DeLuca |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0326660 A1 | 12/2012 | Lu et al. |
| 2013/0024059 A1 | 1/2013 | Miller et al. |
| 2013/0026982 A1 | 1/2013 | Rothenbaum |
| 2013/0207604 A1 | 8/2013 | Zeine |
| 2013/0241468 A1* | 9/2013 | Moshfeghi ............ H02J 7/025 320/107 |
| 2013/0241474 A1 | 9/2013 | Moshfeghi |
| 2014/0008992 A1 | 1/2014 | Leabman |
| 2014/0008993 A1 | 1/2014 | Leabman |
| 2014/0035524 A1 | 2/2014 | Zeine |
| 2014/0049422 A1 | 2/2014 | Von Novak et al. |
| 2014/0062395 A1 | 3/2014 | Kwon et al. |
| 2014/0217967 A1 | 8/2014 | Zeine et al. |
| 2014/0241231 A1 | 8/2014 | Zeine |
| 2014/0265725 A1 | 9/2014 | Angle et al. |
| 2014/0265727 A1 | 9/2014 | Berte |
| 2014/0265943 A1 | 9/2014 | Angle et al. |
| 2014/0281655 A1 | 9/2014 | Angle et al. |
| 2014/0354063 A1 | 12/2014 | Leabman et al. |
| 2014/0354221 A1 | 12/2014 | Leabman et al. |
| 2014/0368048 A1 | 12/2014 | Leabman et al. |
| 2014/0375255 A1 | 12/2014 | Leabman et al. |
| 2015/0015194 A1 | 1/2015 | Leabman et al. |
| 2015/0015195 A1 | 1/2015 | Leabman et al. |
| 2015/0022010 A1 | 1/2015 | Leabman et al. |
| 2015/0102681 A1 | 4/2015 | Leabman et al. |
| 2015/0102769 A1 | 4/2015 | Leabman et al. |
| 2015/0130285 A1 | 5/2015 | Leabman et al. |
| 2015/0199665 A1 | 7/2015 | Chu |

FOREIGN PATENT DOCUMENTS

| | | |
|---|---|---|
| KR | 1020130026977 A | 3/2013 |
| WO | 9952173 A2 | 10/1999 |
| WO | 03091943 A1 | 11/2003 |
| WO | 2004077550 A1 | 9/2004 |
| WO | 2008156571 A2 | 12/2008 |
| WO | 2010022181 A1 | 2/2010 |
| WO | WO2010022181 A1 | 2/2010 |
| WO | 2013035190 A1 | 3/2013 |

OTHER PUBLICATIONS

International Search Report dated Jan. 27, 2015 corresponding to International Patent Application No. PCT/US2014/037170, 4 pages.
International Search Report dated Oct. 16, 2014 corresponding to International Patent Application No. PCT/US2014/041546, 4 pages.
International Search Report dated Oct. 13, 2014 corresponding to International Patent Application No. PCT/US2014/041534, 4 pages.
International Search Report dated Nov. 12, 2014 corresponding to International Patent Application No. PCT/US2014/046956, 4 pages.
Written Opinion of the International Searching Authority dated Nov. 12, 2014 corresponding to International Patent Application No. PCT/US2014/046956, 6 pages.

* cited by examiner

WIRELESS SOUND CHARGING METHODS AND SYSTEMS FOR GAME CONTROLLERS, BASED ON POCKET-FORMING

CROSS-REFERENCES TO RELATED APPLICATIONS

The present invention is related to U.S. Non-Provisional patent application Ser. Nos. 13/891,430 filed May 10, 2013, entitled "Methodology For Pocket-forming"; 13/925,469 filed Jun. 24, 2013, entitled "Methodology for Multiple Pocket-Forming"; 13/946,082 filed Jul. 19, 2013, entitled "Method for 3 Dimensional Pocket-forming"; 13/891,399 filed May 10, 2013, entitled "Receivers for Wireless Power Transmission" and 13/891,445 filed May 10, 2013, entitled "Transmitters For Wireless Power Transmission", the entire contents of which are incorporated herein by these references.

FIELD OF INVENTION

The present invention relates to wireless power transmission, and more particularly to wireless charging systems and methods for game controllers, based on Pocket-forming of sound waves.

BACKGROUND OF THE INVENTION

Wireless game controllers have been known in the art since a while ago. However, few methods for providing wireless charging to these devices have been disclosed. The current methods for providing wireless charging transmission may require a charging station where the game controller may be placed so as to make physical contact with the charging station, this method may be known as magnetic induction. There may be other similar methods but they may be inconvenient and troublesome since the gamer may not be able to use the game controller while charging it.

Therefore, there is still a need for a method that allows gamers to use the wireless game controllers while charging them.

SUMMARY OF THE INVENTION

The present invention provides wireless sound charging methods and systems for powering or charging game controllers. The method may include a type of transmitter which may be employed for sending Sound Waves (SW) signals to electronic devices, such as game controllers. Game controllers may also include a type of receiver embedded or attached to it for converting SW signals into suitable electricity for powering and charging themselves. The technique employed may be known as pocket-forming and may be incorporated here by reference.

A first embodiment for providing wireless sound power to game controllers, may be provided. In this embodiment, a transmitter may be located at the ceiling of a living room and provide wireless sound power to game controllers.

A second embodiment for providing wireless power to game controllers, may be provided. In this embodiment, a transmitter may be found as part of a game console. The transmitter may be internally connected to the game console and provide wireless power to game controllers.

A third embodiment for providing wireless power to game controllers, may be provided. In this embodiment, a transmitter may be found as a separate device which may be connected to a game console through suitable and well known in the art techniques such as universal serial bus (USB). The transmitter may provide wireless sound power to game controllers.

Numerous other aspects, features and benefits of the present invention may be made apparent from the following detailed description taken together with the drawing figures.

BRIEF DESCRIPTION OF THE DRAWINGS

Embodiments of the present invention are described by way of example with reference to the accompanying figures, which are schematic and may not be drawn to scale. Unless indicated as representing prior art, the figures represent aspects of the present invention. The main features and advantages of the present invention will be better understood with the following descriptions, claims, and drawings, where:

DETAILED DESCRIPTION OF THE DRAWINGS

Definitions

Figure 1:
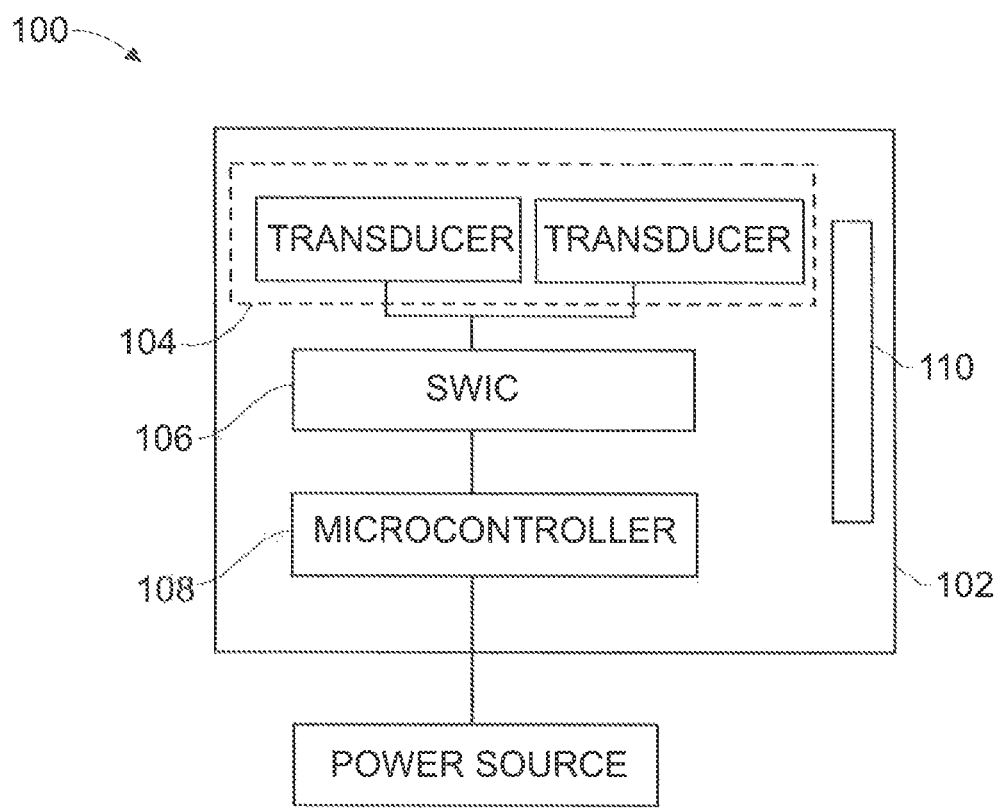
FIG. 1 illustrates a component level embodiment for a transmitter in accordance with the present invention.

"Pocket-forming" may refer to generating two or more sound waves which converge in 3-d space, forming controlled constructive and destructive interference patterns.

"Pockets of energy" may refer to areas or regions of space where energy or power may accumulate in the form of constructive interference patterns of sound waves.

"Null-space" may refer to areas or regions of space where pockets of energy do not form because of destructive interference patterns of sound waves.

"Transmitter" may refer to a device, including a chip which may generate two or more SW signals, at least one SW signal being phase shifted and gain adjusted with respect to other SW signals, substantially all of which pass through one or more transducers such that focused SW signals are directed to a target.

"Receiver" may refer to a device including at least one antenna element, at least one rectifying circuit and at least one power converter, which may utilize pockets of energy for powering, or charging an electronic device.

"Adaptive pocket-forming" may refer to dynamically adjusting pocket-forming to regulate power on one or more targeted receivers.

DESCRIPTION OF THE DRAWINGS

In the following detailed description, reference is made to the accompanying drawings, which form a part hereof. In the drawings, which may not be to scale or to proportion, similar symbols typically identify similar components, unless context dictates otherwise. The illustrative embodiments described in the detailed description, drawings and claims, are not meant to be limiting. Other embodiments may be used and/or and other changes may he made without departing from the spirit or scope of the present invention.

As background, a sound waveform has the same characteristics as that of an electrical waveform which are Wavelength (λ), Frequency (f) and Velocity (m/s). Both the sounds frequency and wave shape are determined by the origin or vibration that originally produced the sound but the velocity is dependent upon the medium of transmission (air, water etc.) that carries the sound wave. Audio Sound Transducers include both input sensors, that convert sound into and electrical signal such as a Microphone and output actuators that convert the electrical signals back into sound such as a loudspeaker.

FIG. 1 shows an example of a transmitter 100 that can be used for pocket-forming utilizing a sound transducer. In this embodiment, transmitter 100 may be used to provide wireless power transmission. Transmitter 100 may include a housing 102 having at least two or more antenna elements 104, at least one SW integrated circuit (SWIC 106), at least one digital signal processor (DSP) or micro-controller 108, and one communications component 110. Housing 102 can be made of any suitable material which may allow for signal or wave transmission and/or reception, for example plastic or hard rubber. Transducer elements 104 may include suitable transducer types for operating in frequency bands such as 10 KHz to 50 KHz as these frequency bands are ideally suited for sound transmission in wireless power transmission. Transducer elements 104 may include piezoelectric transducers and similar such transducers capable of producing controlled sound waves that are directed to electronic device ready to be powered. Micro-controller 108 may then process information sent by a receiver through communications component 110 for determining optimum times and locations for pocket-forming. Communications component 110 may be based on standard wireless communication protocols which may include Bluetooth, Wi-Fi or ZigBee. In addition, communications component 110 may be used to transfer other information such as an identifier for the device or user, battery level, location or other such information. Other communications component 110 may be possible which may include radar, infrared cameras or sound devices for sonic triangulation for determining the device's position.

Figure 2:
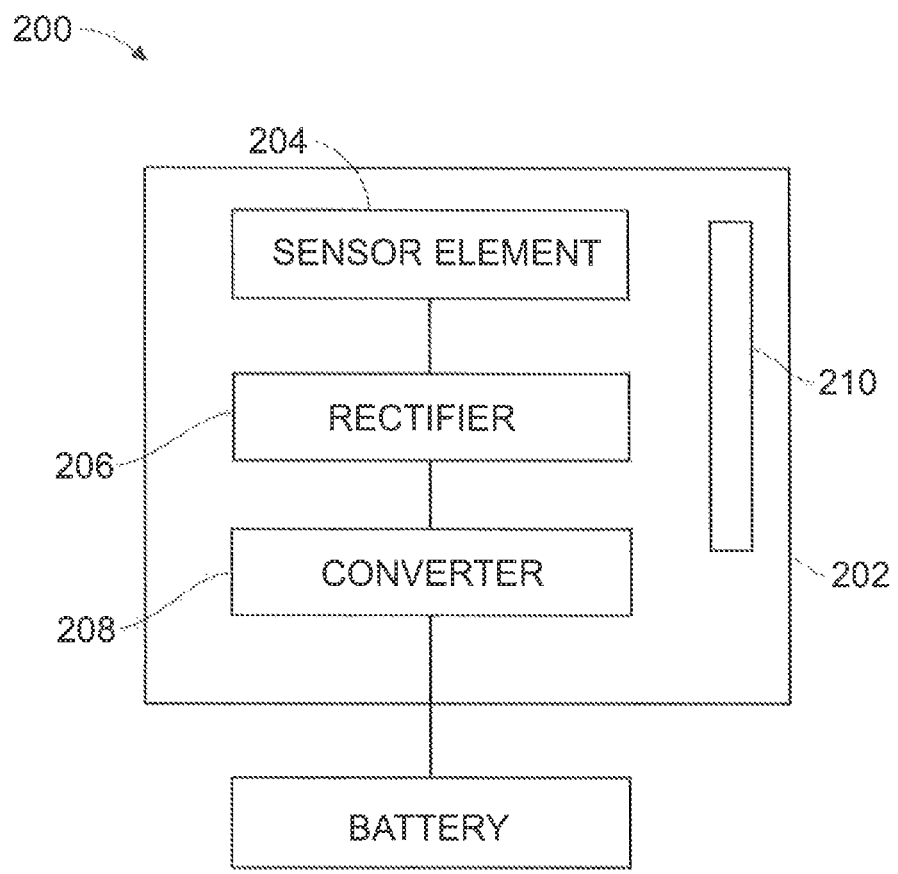
FIG. 2 illustrates a component level embodiment for a receiver in accordance with the present invention.

FIG. 2 shows an example of a receiver 200 that can be used for pocket-forming. In this embodiment, receiver 200 may be used for powering or charging an electronic device. Receiver 200 may also include a housing 202 having at least one sensor element 204, one rectifier 206, one power converter 208 and one or more communications component 210. Housing 202 can be made of any suitable material which may allow for signal or wave transmission and/or reception, for example plastic or hard rubber. Housing 202 may be an external hardware that may be added to different electronic equipment, for example in the form of cases, or can be embedded within electronic equipment as well. Sensor element 204 may include suitable sensor types for operating in frequency bands such as those described for transmitter 100 from FIG. 1. Sensor element 204 may include multiple sensors in an array to better receive the power sound waves from the transmitter. Multiple sensors are beneficial in receivers or on the electronic device itself where there may not be a preferred orientation during usage or whose orientation may vary continuously through time, for example a smartphone or portable gaming system. On the contrary, for electronic devices with well-defined orientations, for example a two-handed video game controller, there might be a preferred orientation for the sensor element which may dictate a ratio for the number of sensors used on a given electronic device to be charged.

Suitable sensor elements 204 are microphone types. A sound transducer that can be classed as a "sound sensor". This is because it produces an electrical analogue output signal which is proportional to the "acoustic" sound wave acting upon its flexible diaphragm. This signal is an "electrical image" representing the characteristics of the acoustic waveform. Generally, the output signal from a microphone is an analogue signal either in the form of a voltage or current which is proportional to the actual sound wave. The most common types of microphones available as sound transducers are Dynamic, Electret Condenser, Ribbon and the newer Piezo-electric Crystal types. This may further prove advantageous as a receiver, such as receiver 200, where the sensor element 204 is a dynamic moving-coil microphone sound transducer to optimize wireless power transmission. Rectifier 206 may include diodes or resistors, inductors or capacitors to rectify the alternating current (AC) voltage generated by sensor element 204 to direct current (DC) voltage. Rectifier 206 may be placed as close as is technically possible to sensor element 204 to minimize losses. After rectifying AC voltage, DC voltage may be regulated using power converter 208. Power converter 208 can be a DC-DC converter which may help provide a constant voltage output, regardless of input, to an electronic device, or as in this embodiment to a battery 212. Typical voltage outputs can be from about 5 volts to about 10 volts.

In some embodiments, power converter 208 may include electronic switched mode DC-DC converters which can provide high efficiency. In such a case, a capacitor (not shown) may be included before power converter 208 to ensure sufficient current is provided for the switching device to operate. When charging an electronic device, for example a phone or laptop computer, initial high currents which can break-down the operation of an electronic switched mode DC-DC converter may be required. In such a case, a capacitor (not shown) may be added at the output of receiver 200 to provide the extra energy required. Afterwards, lower power can be provided, for example 1/80 of the total initial power while having the phone or laptop still build-up charge. Lastly, a communications component 210 may be included in receiver 200 to communicate with a transmitter or to other electronic equipment. Such a communications component 210 may be based on standard wireless communication protocols which may include Bluetooth, WI-Fi or ZigBee similar to communications component 110 from transmitter 100.

Figure 3:
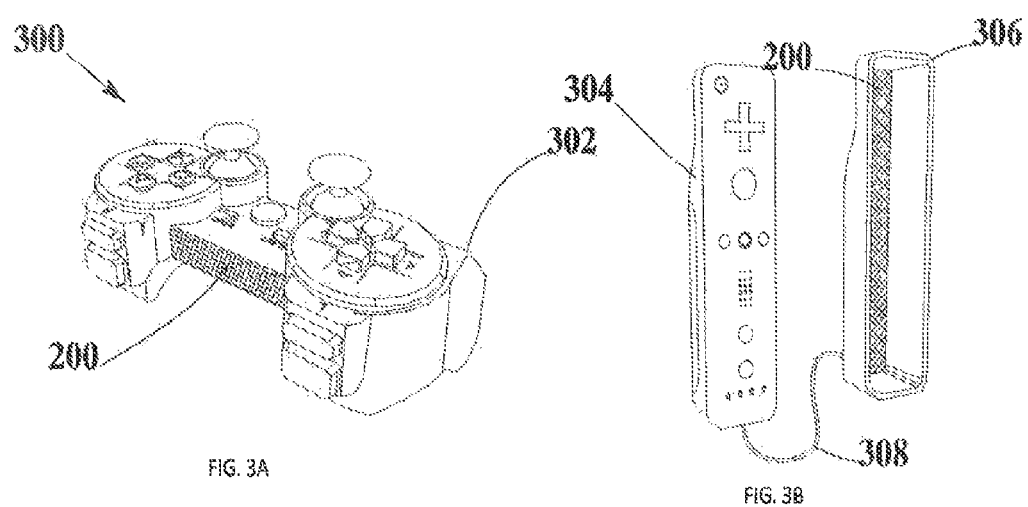
FIG. 3 shows two embodiments for including a receiver, that can be used for pocket-forming, in a game controller in accordance with the present invention.

FIG. 3 illustrates two embodiments including a receiver 200 that can be used for pocket-forming in game controllers 300. FIG. 3A then shows a first embodiment where game controller 302 may include a receiver 200, as the one described in FIG. 2, embedded in its front side. Receiver 200 may include an array of sensor elements 204 strategically distributed on the grid area shown in FIG. 3A. The number and type of sensor elements 204 may be calculated according to the game controller's design.

FIG. 3B shows a second embodiment where game controller 304 may include receiver 200, as the one described in FIG. 2. However, in this embodiment, game controller 304 may need an additional case 306 to provide wireless power to game controller 304. Case 306 may be made out of plastic rubber or any other suitable material for cases, and it may include an array of sensor elements 204 located on the back side of case 306 which number and type may be calculated according to the game controller design, as shown in FIG.

3B. Case 306 may also be connected to game controller 304 through a cable 308, or in other embodiments game controller 304 may just be hooked up to case 306 (not shown), to provide wireless power.

Figure 4:
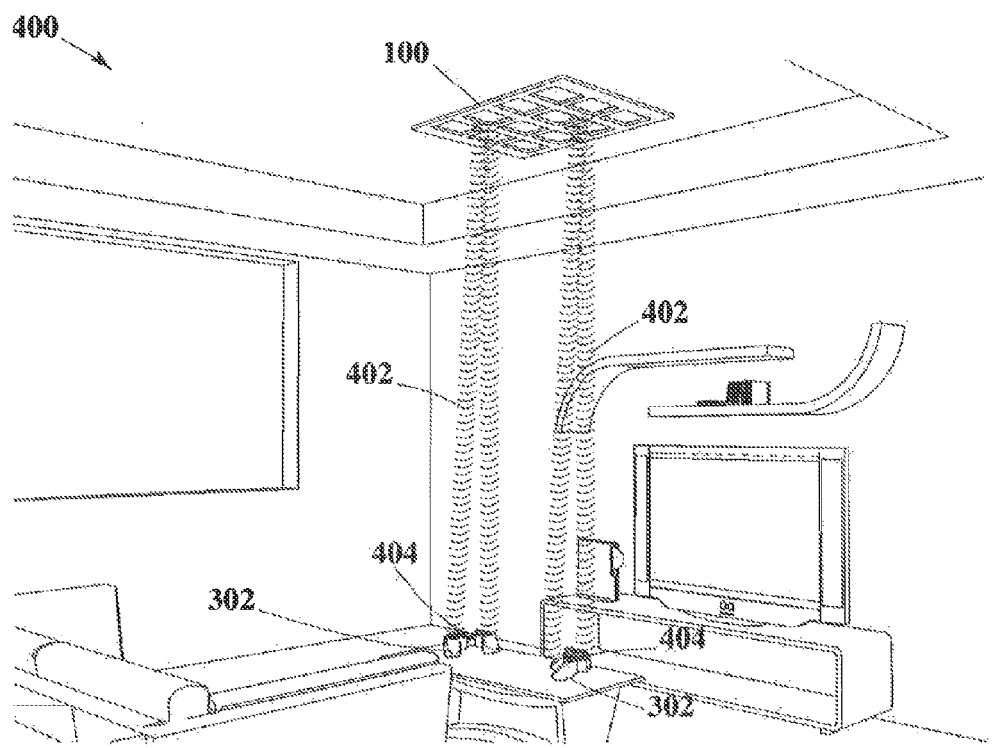
FIG. 4 illustrates a first embodiment for providing wireless power to game controllers, based on pocket-forming in accordance with the present invention.

FIG. 4 illustrates a first embodiment for providing wireless power transmission 400 to game controllers 300, using pocket-forming. Transmitter 100 may be located at the ceiling of a living room pointing downwards, and may transmit controlled sound waves 402 which may converge in 3-d space. The amplitude of the sound waves 402 may be controlled through phase and/or relative amplitude adjustments to form constructive and destructive interference patterns (pocket-forming). Pockets of energy 404 may be formed at constructive interference patterns and can be 3-dimensional in shape whereas null-spaces may be generated at destructive interference patterns. A receiver 200, embedded or attached to game controllers 300, may then utilize pockets of energy 404 produced by pocket-forming for charging or powering an electronic device, for example a game controller 302 or game controller 304, and thus effectively providing wireless power transmission 400.

In an embodiment, transmitter 100 may include a housing 102 where at least two or more transducer elements 104, at least one SW integrated circuit (SWIC 106), at least one digital signal processor (DSP) or micro-controller 108, and one communications component 110 may be included. Transmitter 100 may also include a local oscillator chip for converting alternating current (AC) power to SW signals. Such SW signals may firstly be phase and gain adjusted through an SWIC 106 proprietary chip, and then converted to SW signals 402 via transducer elements 104. On the other hand, receiver 200 may include a housing 202 where at least one sensor element 204, at least one rectifier 206 and at least one power converter 208 may be included. The receiver 200 communicates with transmitter 100 through short RF waves 402 or pilot signals sent through an antenna connected to the communications component 210. In some embodiments, receiver 200 may include an optional communications device for communicating on standard wireless communication protocols such as Bluetooth, Wi-Fi or Zigbee with transmitter 100. In some embodiments, receiver 200 may be implemented externally to electronic devices in the form of cases, e.g. camera cases, phone cases and the like which may connect through suitable and well known in the art techniques such as universal serial bus (USB). In other embodiments, receiver 200 may be embedded within electronic devices.

Figure 5:
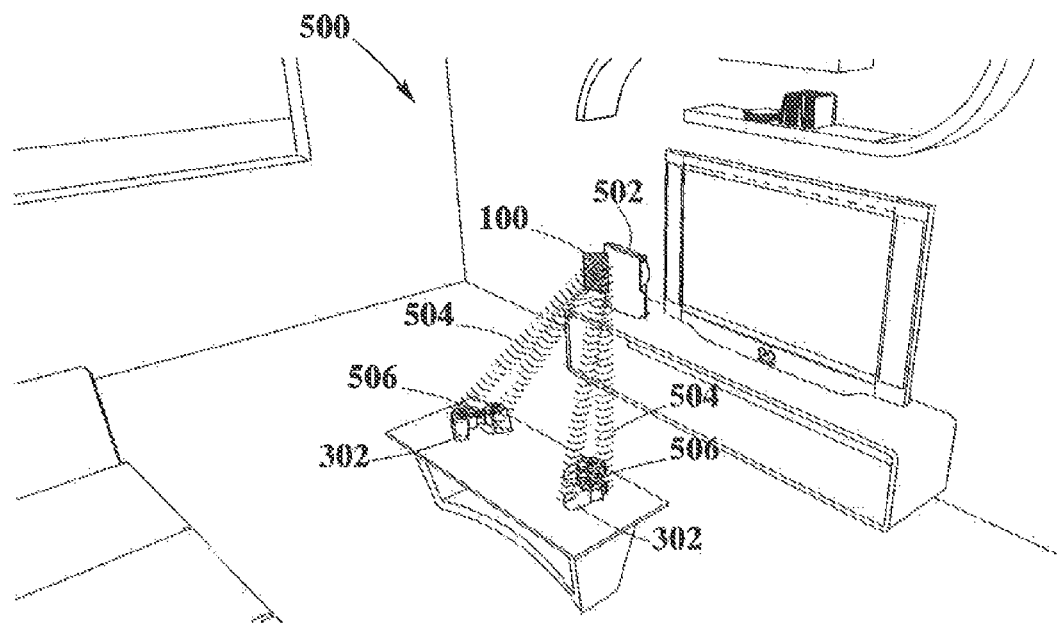
FIG. 5 illustrates a second embodiment for providing wireless power to game controllers, based on pocket-forming in accordance with the present invention.

FIG. 5 illustrates a second embodiment for providing wireless power transmission 500 to game controllers 300, based on pocket-forming. In this embodiment, transmitter 100 may be included as part of the game console 502, and may be positioned as an attachment of the cover of game console 502, as shown in FIG. 5. Transmitter 100 may be internally connected to game console 502 and produce controlled sound waves 504. Controlled sound waves 504 may then create pockets of energy 506 on receiver 200, which may be embedded in game controller 302. Game controller 302 may then utilize pockets of energy 506, produced by pocket-forming, for charging or powering itself.

Figure 6:
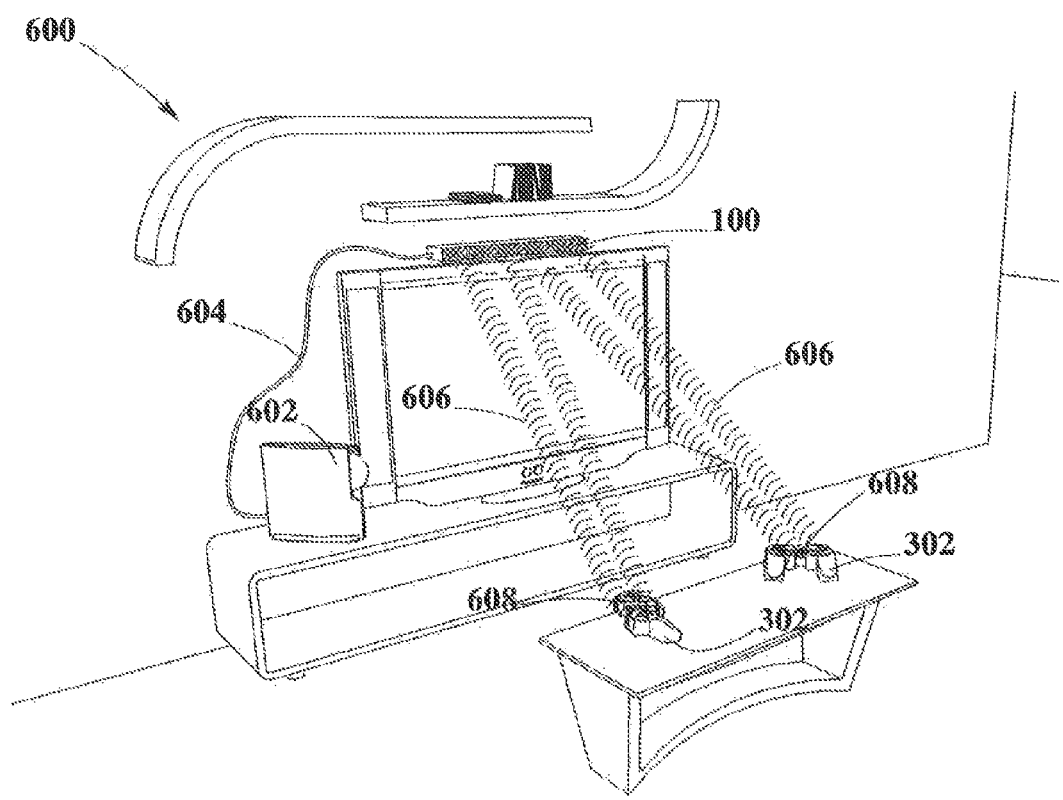
FIG. 6 illustrates a third embodiment for providing wireless power to game controllers, based on pocket-forming in accordance with the present invention.

FIG. 6 illustrates a third embodiment for providing wireless power transmission 600 to game controllers 300, based on pocket-forming. In this embodiment, transmitter 100 may be included as a separate device and may be connected to game console 602 through suitable and well known in the art techniques such as a USB cable 604. Transmitter 100 may then obtain from game console 602 the power necessary to produce controlled sound waves 606 and send them to game controllers 302 so as to produce pockets of energy 608 on receiver 200, which may be embedded in game controller 302. Game controller 302 may then utilize pockets of energy 608, produced by pocket-forming, for charging or powering itself.

While the foregoing disclosure, system configuration, methods and various aspects and embodiments have been disclosed herein, other aspects and embodiments are contemplated. The various aspects and embodiments disclosed herein are for purposes of illustration and are not intended to be limiting, with the true scope and spirit being indicated, the invention should be construed to include everything within the scope of the appended claims and equivalents.

Having thus described the invention, I claim:

1. A method for wireless charging of a game controller, comprising:
   connecting a pocket-forming transmitter to a power source;
   generating sound waves from a sound circuit embedded within the transmitter;
   controlling the generated sound waves with a digital signal processor in the transmitter;
   transmitting the sound waves through antenna elements connected to the transmitter to a receiver configured to capture the sound waves forming a pocket of energy in 3-D space at the receiver with antenna elements connected to the game controller to convert the pocket of energy into a DC voltage for charging or powering a battery of the gamer controller, wherein the controlled sound waves are controlled through phase and relative amplitude adjustments to form constructive interference patterns that result in the pocket of energy at the receiver for the game controller.

2. The method for wireless charging of a game controller of claim 1, wherein the transmitter is mounted in a central location within a gaming room and the receiver is mounted on or connected to the game controller.

3. The method for wireless charging of a game controller of claim 1, further comprising:
   communicating a power level of the battery and a location of the game controller within a gaming room.

4. The method for wireless charging of a game controller of claim 1, wherein the transmitter and the receiver each include communication circuitry for communicating information between the transmitter and the receiver.

5. The method for wireless charging of a game controller of claim 1, wherein the pocket-forming transmitter is mounted on a ceiling of a game room or mounted on a game console within the game room.

6. The method for wireless charging of a game controller of claim 1, wherein the receiver and the antenna elements are mounted to the game controller or the receiver and the antenna elements are mounted on a case connected electrically to the game controller.

7. The method for wireless charging of a game controller of claim 6, wherein the case is made out of plastic, rubber or any other suitable material with the antenna elements are mounted on the backside of the case with the number and type of elements are predetermined according to the game controller design.

8. The method for wireless charging of a game controller of claim 4, wherein the communication circuitry is configured to use wireless communication protocols including at least one of Bluetooth, Wi-Fi, Zigbee, and FM radio-between the transmitter and receiver.

9. The method for wireless charging of a game controller of claim 1, wherein the antenna elements in the transmitter and the receiver operate in the frequency bands of about 10 KHz to about 50 KHz.

10. The method for wireless charging of a game controller of claim 1, further comprising:
generating multiple pockets of energy from the pocket-forming transmitter to power or charge multiple game controllers within a predetermined distance from the transmitter.

11. The method for wireless charging of a game controller of claim 1, wherein the receiver is external to the game controller in the form of a case that is a camera case, phone case or other type of external case connected to the game controller through an universal serial bus.

12. The method for wireless charging of a game controller of claim 1, further comprising:
communicating between the receiver and the transmitter through one or more communication signals or one or more pilot signals using wireless communication protocols including at least one of Bluetooth, Wi-Fi, Zigbee, and FM radio signals.

13. The method for wireless charging of a game controller of claim 1, wherein one or more communication signals sent by the receiver provide times and locations for transmitter pocket-forming and the convergence to form the pocket of energy in 3-D space to predetermined receivers of game controllers within a predetermined distance from the transmitter in a game room.

14. A wireless device for transmission of power to a game controller, comprising:
a pocket-forming transmitter for emitting power sound waves to form a pocket of energy to converge in 3-D space connected to a power source;
a receiver embedded or attached to the game controller for receiving and converting the pocket of energy to a DC voltage for charging or powering a battery of the game controller; and
a controller configured to control the sound waves through phase and relative amplitude adjustments to form constructive interference patterns that result in the pocket of energy at the receiver for the game controller.

15. The wireless device for transmission of power to a game controller of claim 14, wherein the pocket-forming transmitter is located on the ceiling of the game room pointing downward toward the receiver for charging or powering the battery of the game controller.

16. The wireless device for transmission of power to a game controller of claim 14, wherein the pocket-forming transmitter is internally connected to a game console and the transmitter is connected to the game console power source to produce the power sound waves.

17. The wireless device for transmission of power to a game controller of claim 14, wherein the receiver is embedded or attached to the game controller.

18. The wireless device for transmission of power to a game controller of claim 14, wherein the transmitter is a separate device connected to a game console through a cable or USB cable for the power source.

19. An apparatus for wireless power transmission to a game controller, comprising:
a battery connected to the game controller;
a pocket-forming transmitter having at least two or more transducer elements, at least one sound integrated circuit, at least one digital signal processor or microcontroller and a communication circuit for generating controlled sound waves to form a pocket of energy consisting of constructive interference patterns of the generated sound waves to converge in 3-D space at predetermined locations; and
a receiver embedded or attached to the game controller having at least one antenna element, at least one rectifier, at least one power converter and a communication circuit for communicating with the transmitter the exact location and power requirements of the game controller for receiving the pocket of energy converging in the 3-D space at the receiver to charge or power the game controller, wherein the transducer elements of the transmitter operate in independent frequencies that allow a multichannel operation of pocket-forming in an array arrangement selected from a group consisting of single array, pair array, and quad array for powering the game controller within a gaming room.

20. The apparatus for wireless power transmission to a game controller of claim 19, wherein the communication circuit of the transmitter and the communication circuit of the receiver communicate using wireless protocols including at least one of Bluetooth, infrared, Wi-Fi, FM radio, and Zigbee.

21. The apparatus for wireless power transmission to a game controller of claim 19, wherein the transmitter further includes a piezoelectric crystal capable of producing power sound waves for wireless transmission of power to charge the game controller.

22. The apparatus for wireless power transmission to a game controller of claim 19, wherein the transducer elements of the transmitter operate in frequency bands of about 10 KHz to about 50 KHz.

23. The apparatus for wireless power transmission to a game controller of claim 19, wherein the transducer elements of the transmitter include different arrangements of the transducers to maximize the transmission of the pocket of energy to predetermined game controllers at optimum times and locations within a gaming room.

* * * * *